United States Patent
Suzuki

(10) Patent No.: US 6,679,355 B2
(45) Date of Patent: Jan. 20, 2004

(54) ELECTRIC BRAKING DEVICE AND METHOD OF CONTROLLING THE SAME

(75) Inventor: Yoshihiko Suzuki, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 0 days.

(21) Appl. No.: 10/053,644

(22) Filed: Jan. 24, 2002

(65) Prior Publication Data

US 2002/0104718 A1 Aug. 8, 2002

(30) Foreign Application Priority Data

Jan. 24, 2001 (JP) .......................... P2001-15269

(51) Int. Cl.$^7$ ............................................. F16D 55/02
(52) U.S. Cl. .................... 188/71.9; 188/156; 188/1.112
(58) Field of Search ................ 188/1.11 L, 1.11 E, 188/71.7, 71.8, 77.9, 72.8, 156, 157, 158, 159, 160, 162

(56) References Cited

U.S. PATENT DOCUMENTS

| 4,602,702 | A | * | 7/1986 | Ohta et al. ................ 188/72.1 |
| 4,623,044 | A | * | 11/1986 | Ohta et al. ................ 188/72.1 |
| 4,784,244 | A | * | 11/1988 | Carre et al. ................ 188/156 |
| 5,348,123 | A | * | 9/1994 | Takahashi et al. ......... 188/72.1 |
| 5,839,800 | A | * | 11/1998 | Koga et al. ................ 303/152 |
| 5,915,504 | A | * | 6/1999 | Doricht .................... 188/72.1 |
| 5,957,246 | A | * | 9/1999 | Suzuki ..................... 188/72.1 |
| 6,138,801 | A | * | 10/2000 | Shirai et al. ............... 188/157 |
| 6,139,117 | A | * | 10/2000 | Shirai et al. ............... 303/3 |
| 6,158,822 | A | * | 12/2000 | Shirai et al. ............... 303/3 |
| 6,186,599 | B1 | * | 2/2001 | Otomo et al. .............. 303/20 |
| 6,199,670 | B1 | * | 3/2001 | Shirai et al. ............... 188/158 |
| 6,270,172 | B1 | * | 8/2001 | Shirai et al. ............... 303/152 |
| 6,305,506 | B1 | * | 10/2001 | Shirai et al. ............... 188/72.2 |
| 2002/0023806 | A1 | * | 2/2002 | Ohtani et al. .............. 188/72.1 |

FOREIGN PATENT DOCUMENTS

| JP | 9-137841 | 5/1997 |
| JP | 2000-18294 | 1/2000 |

* cited by examiner

Primary Examiner—Christopher P. Schwartz
Assistant Examiner—Devon C Kramer
(74) Attorney, Agent, or Firm—Morgan, Lewis & Bockius LLP

(57) ABSTRACT

The disclosure presents a control method for an electric braking device which includes a brake switch, a pushing force sensor, a thrust sensor, and an electric motor which moves a pad thrust member in a direction in which the pad thrust member approaches to a rotor rotating with the vehicle wheel associated therewith, thereby performing a braking operation. In the control method, a brake target value as computed by using an output signal of the pushing force sensor is compared with a threshold value as set to a minute braking force when the brake switch is in an on state. When the brake target value is below the threshold value, the electric motor is controlled with a predetermined value as the target value, and after the brake switch is turned off, the electric motor is rotated for a predetermined time to retract the pad thrust member.

6 Claims, 5 Drawing Sheets

ELECTRIC BRAKING DEVICE AND METHOD OF CONTROLLING THE SAME

BACKGROUND OF THE INVENTION

1. Field of the Invention

The present invention relates to a method of controlling an electric braking device which is capable of setting a pad clearance without using a position sensor in a motor-driven disc brake, and a device for executing the same.

2. Description of the Related Art

Techniques for setting a pad clearance between the pad and the rotor in a non-braking mode of the braking device are proposed in Japanese Patent Laid-Open Nos. 137841/1997 and 2000-18294.

In the former publication, the control unit has a thrust control function to control the action of the actuator in accordance with a detected signal from the thrust sensor and a position control function for controlling the action of the actuator in accordance with a detected signal from the position sensor. With those functions, when the braking operation is released, a position at which the friction material starts to operate is accurately and reliably corrected to a correct position in accordance with a degree of wear of the friction material.

In the latter publication, the electric braking device includes a differentiating circuit for differentiating an output signal of the thrust sensor, and a circuit for comparing a differentiated value with a threshold value. The clearance control is performed while using a position where the differentiated value of the output signal of the thrust sensor is smaller than the threshold value as the origin.

In the techniques of those publications, the output signals of the position sensor and the thrust sensor are indispensably used in adjusting the pad clearance. Accordingly, it is essential to form the spaces for accommodating the sensors in the caliper. This creates problems such that it is necessary to secure the sensor mounting positions, and the number of wires is increased. The problems will hinder the reduction of the size and weight of the braking device.

SUMMARY OF THE INVENTION

Accordingly, an object of the present invention is to provide a control method for an electric braking device which is capable of executing a brake control and a pad clearance control by using only the thrust sensor, and a device for executing the same.

In the present invention, a target value as computed by using a brake pushing force and a predetermined threshold value are compared with each other when a brake switch (3) is in an on state. When a target value as obtained when a brake switch (3) is in an on state is below a predetermined threshold value, the electric motor is controlled so that the target value approaches to and is equal to a predetermined target value (a fixed braking force having such a magnitude as not to cause a dragging of the brake). Thereafter, when the brake switch (3) is turned off, the electric motor (10) is rotated for a predetermined time to retract the pad thrust member, whereby the pad clearance (the return quantity of the pad) is automatically set. Accordingly, the number of sensors used is reduced, and the control is well performed.

To achieve the above object, there is provided a method of controlling an electric braking device which includes a brake switch (3), a pushing force sensor (2), a thrust sensor (15), and an electric motor which moves a pad thrust member in a direction in which the pad thrust member approaches to a rotor (4) which rotates with the vehicle wheel associated therewith, thereby performing a braking operation. In the control method, a brake target value as computed by using an output signal of the pushing force sensor (2) and a threshold value as set to a minute braking force are compared with each other when the brake switch (3) is in an on state. When the brake target value is below the threshold value, the electric motor (10) is controlled with a predetermined value as the target value, and after the brake switch (3) is turned off, the electric motor (10) is rotated for a predetermined time to retract the pad thrust member.

In the control method, the predetermined-time rotation of the electric motor (10) is performed after the brake switch (3) is turned off and a post stage control is continued for a first predetermined time.

Also in the control method, the pad thrust member (17) is coupled to the electric motor through a rotation-linear motion converting mechanism (13) including a gear nut (14) and a screw shaft screw-coupled to the gear nut. The thrust sensor (15) is provided between a bearing rotatably holding the gear nut (14) and a caliper. The motor operated actuator (10) is controlled in accordance with a difference between a brake target value as computed by using an output signal of the pushing force sensor (2) and a braking force obtained from the thrust sensor (15).

According to another aspect of the invention, there is provided an electric braking device having an electric motor which moves a pad thrust member (17) in a direction in which the pad thrust member approaches to a rotor (4) which rotates with the vehicle wheel associated therewith, thereby performing a braking operation. In the electric braking device, the pad thrust member (17) is coupled to the electric motor through a rotation-linear motion converting mechanism (13) including a gear nut (14) and a screw shaft (16) screw-coupled to the gear nut (14). A thrust sensor (15) for measuring a thrust force of the pad thrust member (17) against the rotor (4) is provided between a bearing (21) for rotatably holding the gear nut (14) and a caliper (6).

DETAILED DESCRIPTION OF THE PREFERRED EMBODIMENTS

Figure 1:
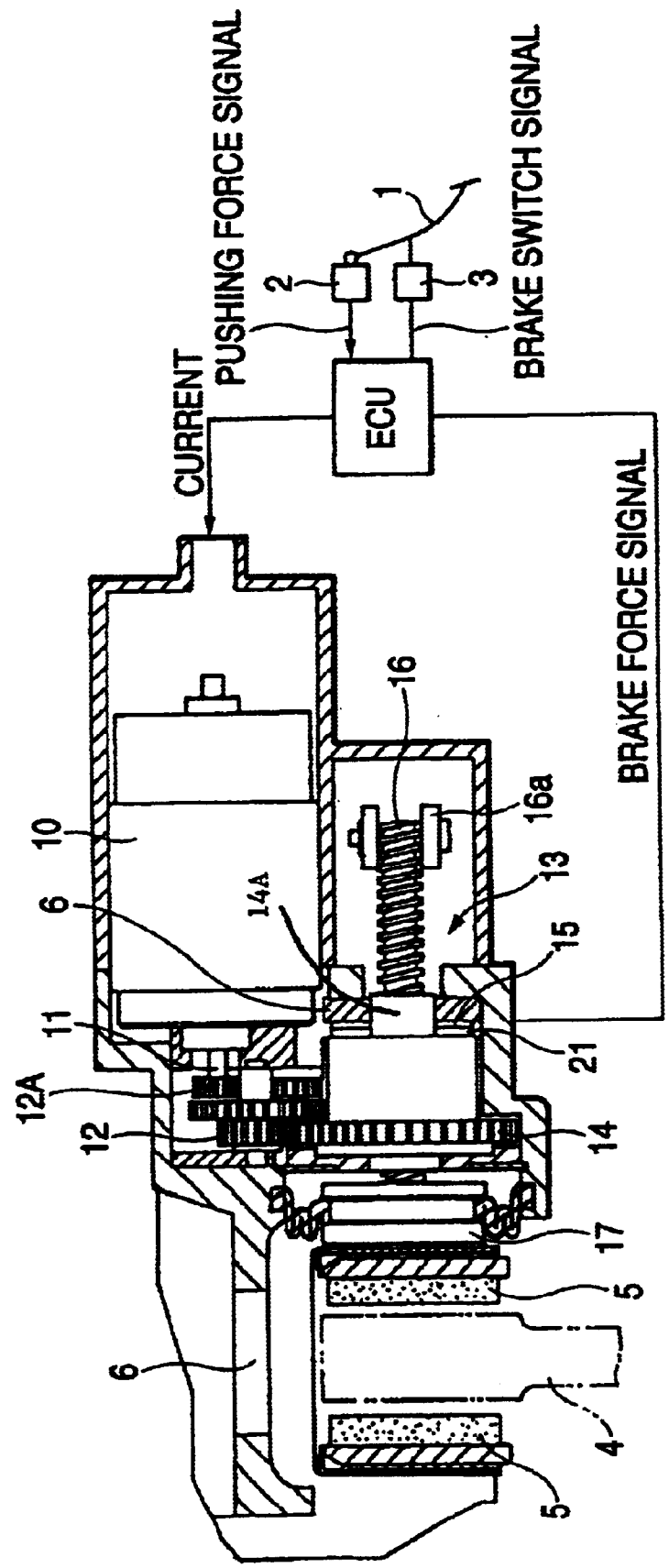
FIG. 1 is a diagram showing a scheme of an electric braking device according to an embodiment of the present invention.

The preferred embodiment of the present invention will be described with reference to the accompanying drawings. FIG. 1 is a diagram showing a scheme of an electric braking device according to an embodiment of the present invention.

The electric braking device shown in FIG. 1 is a so-called floating type disc brake. In the figure, reference numeral 1 is a brake pedal; 2 is a pushing force sensor which detects a pushing force of the brake pedal 1; and 3 is a brake switch which detects a brake pedal operation. A stroke sensor for detecting a pushing or depression amount of the brake pedal 1 may be used for the pushing force sensor 2. ECU is an electronic control unit which receives information from the sensors mentioned above, a thrust sensor 15 to be described later, and the like, and controls a motor operated actuator (electric motor) 10 (A brake control method in this control unit will be described in detail later.). Numeral 4 is a rotor; 5 is a pad (referred to as a friction material); and 6 is a caliper having a brake body.

The electric motor 10 is fixed to the caliper by appropriate fixing means. A final gear 12 is mounted on an output shaft 11 of the electric motor with a reduction gear mechanism 12A being interposed therebetween. The gear 12 is in mesh with a gear nut 14 constituting a rotation-linear motion converting mechanism 13. A nut part 14a of the gear nut 14 is supported on the caliper 6 such that it is rotatable and slightly movable in the axial direction. When the output shaft 11 of the electric motor 10 rotates, the gear 12 and the gear nut 14 also rotates with respect to the caliper 6. A thrust bearing 21 is provided between the gear nut 14 and the caliper (brake body) 6. A thrust sensor 15 is mounted to between the thrust bearing 21 and the caliper (brake body) 6, and detects a braking force. Heat, which is generated in a braking mode and transferred by the rotation-linear motion converting mechanism 13 and the like, is reduced since the thrust sensor 15 is thus provided, and temperature of the sensor does not rise much. Further, the thrust sensor 15 is located near the motor operated actuator 10, so that the wiring is easy. The thrust sensor 15 may be attached to the front side of the pad thrust member 17. In this case, however, the following problem arises. If so attached, braking heat generated between the rotor and the pad is directly transferred to the thrust sensor, thereby possibly causing troubles. For this reason, it is preferable to attach the thrust sensor as mentioned above.

A screw shaft 16 forming the rotation-linear motion converting mechanism 13 is screw-coupled to the gear nut 14. The pad thrust member 17, which supports the pad 5 (referred to as a friction material), is mounted on an end of the screw shaft 16.

In the electric braking device, the electric motor 10 operates in response to a command which is issued from the ECU in accordance with a control mode to be described later. A rotational force of the electric motor 10 is transmitted to the gear nut 14, through the reduction gear mechanism 12A and the gear 12. Then, the screw shaft 16 screw-coupled to the gear nut 14 linearly moves, and the friction material 5 supported on the pad thrust member 17 advances to be pressed against the rotor 4. Under a reaction force generated by the thrusting operation, the caliper 6 also moves toward the rotor 4. The friction material 5 supported on the caliper 6 is pressed against the rotor 4. As a result, the rotor is compressed, on both sides thereof, with the friction materials 5, thereby generating a braking force.

Figure 2:
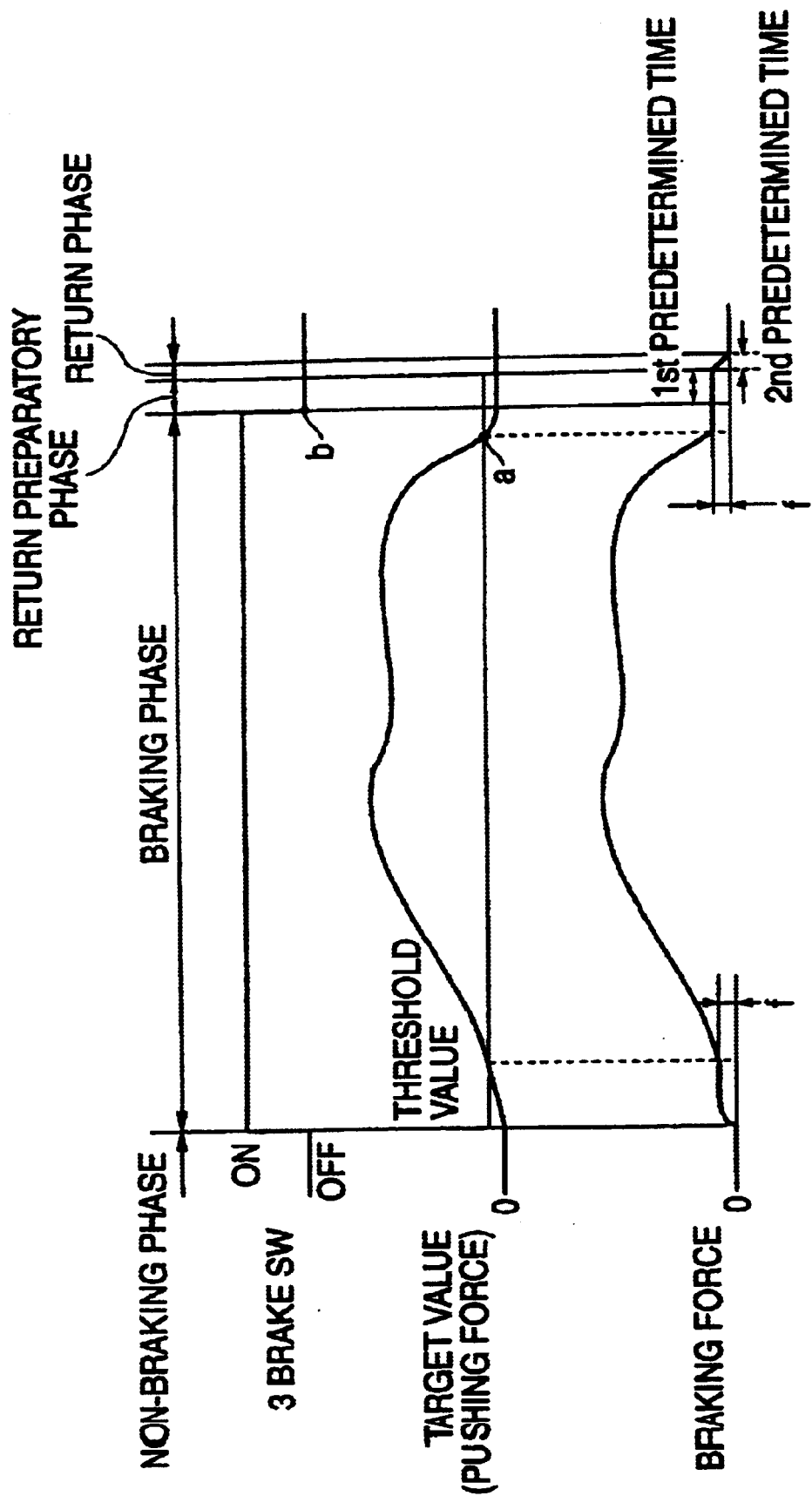
FIG. 2 is a time chart for explaining an operation of the electric braking device when it carries out a control constructed according to the present invention.

Next, a control to cause an automatic adjustment of a pad clearance in the electric braking device will be described with reference to flow charts. FIG. 2 is a time chart showing an operation of the electric braking device when the control is carried out.

The pad clearance control will first be described with reference to the time chart shown in FIG. 2.

In FIG. 2, when the brake pedal 1 is depressed for braking, the brake switch 3 is turned on. When the brake pedal 1 is depressed and a pushing force generated at that time is sensed by the pushing force sensor and input to the ECU, the ECU computes a target value by multiplying the pushing force by a predetermined coefficient. In the ECU, a threshold value is pre-stored and is compared with the computed target value. The electric motor continues its rotation till the target value computed using the pushing force exceeds the threshold value stored in a memory of the ECU, and continues its generation of a fixed braking force ("f" in the figure). When the pushing force increases and the target value exceeds the threshold value, the electric motor then operates so as to generate the braking force corresponding to the pushing force, and the braking force starts to increase with increase of the pushing force. In a case that the target value decreases below the threshold value in a state that the brake switch 3 is in an on state, the electric motor is operated and controlled with a target value which is set at a fixed braking force (f) being equal to the threshold value or smaller.

When the depression of the brake pedal is loosened to release the brake, the pushing force also decreases correspondingly, and the target value as computed using the pushing force lowers below the threshold value. From a time point (a) that the target value decreases below the threshold value, the control of the electric motor starts in a state that the braking force "f" equal to the braking force already stated is used as the target value. This control is continued till a first predetermined time (brake return preparatory phase) elapses after the driver takes off his foot from the brake pedal and the brake switch is turned off. After the first predetermined time elapses, the electric motor is then controlled in rotation in such a direction that the braking force decreases for a second predetermined time (return phase). In this way, the pad clearance control is carried out by outputting a brake return command to the motor for the second predetermined time, which follows the first predetermined time. Accordingly, the pad clearance control is realized without any information from the position sensor. With this unique technical feature, the position sensor, which is essentially used in the conventional technique, is omitted in the present invention.

Figure 3:
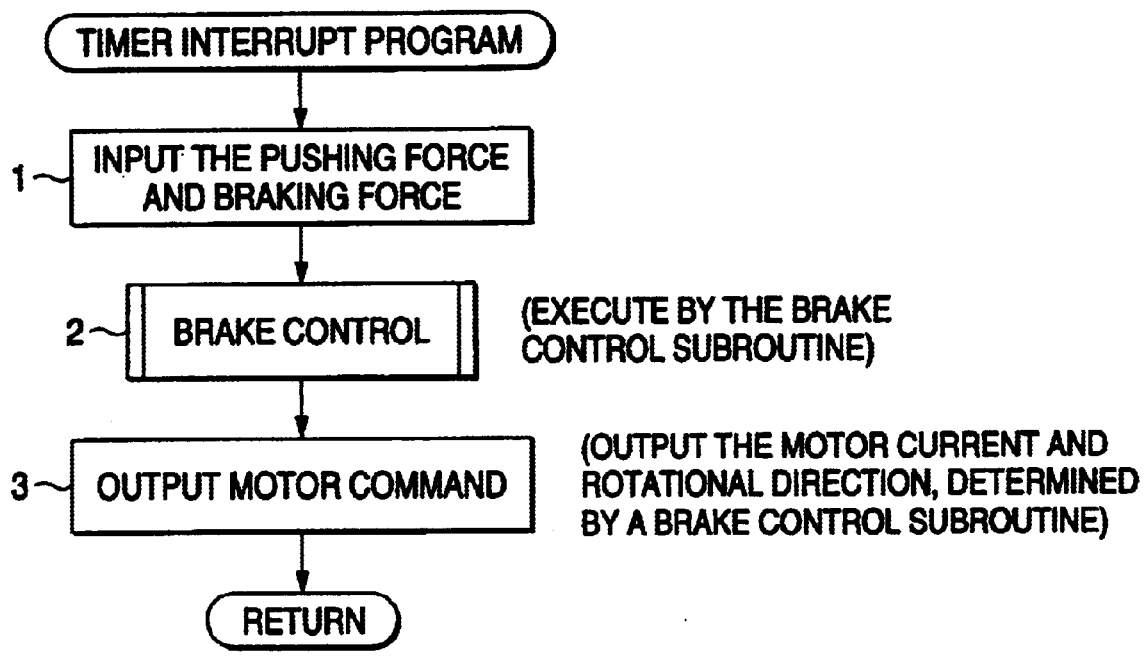
FIG. 3 is a flow chart of a timer interrupt program used in the control of the present invention.
Figure 4:
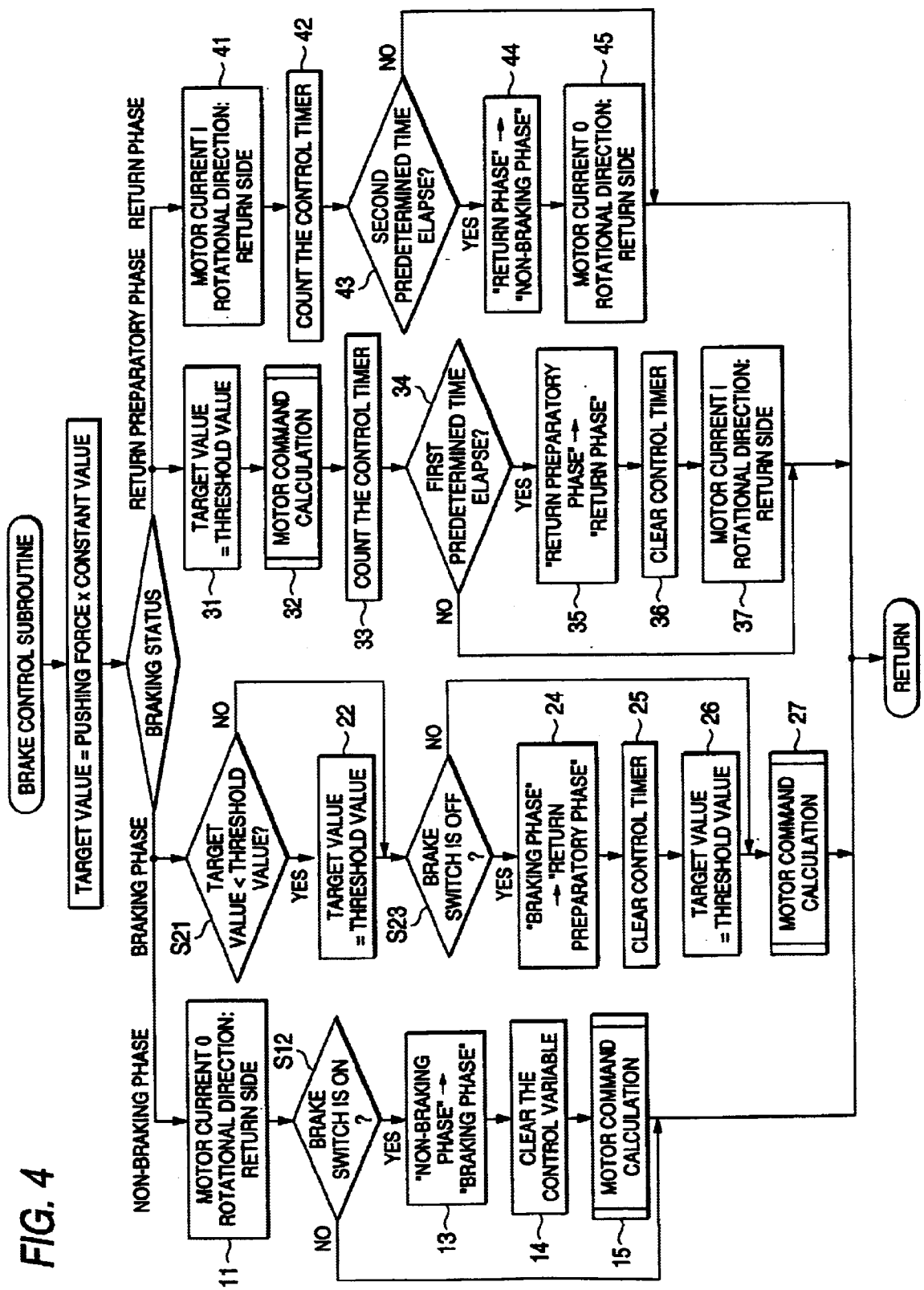
FIG. 4 is a flow chart of a brake control subroutine.
Figure 5:
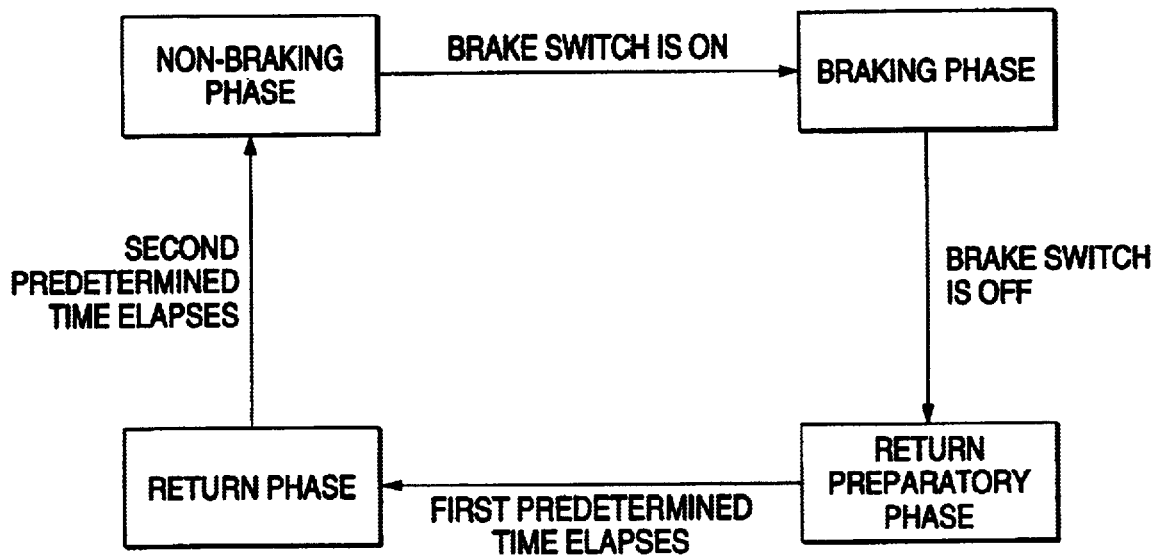
FIG. 5 is a diagram showing a transient diagram of a braking status.
Figure 6:
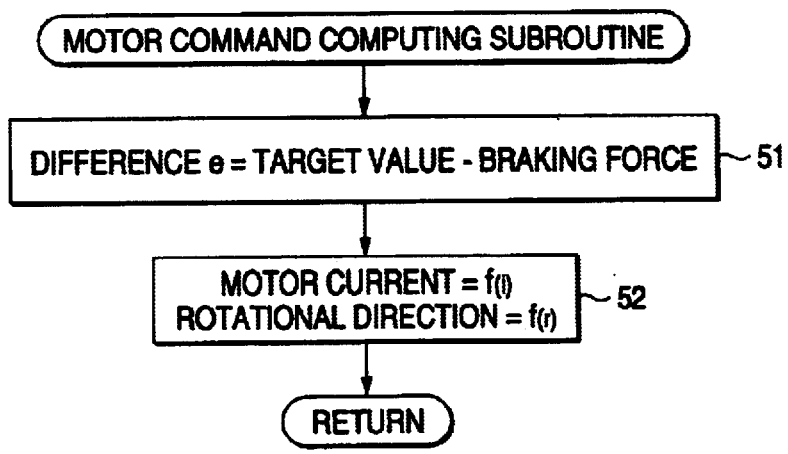
FIG. 6 is a flow chart of a motor-command computing subroutine.

An example of a flow chart of the motor-driven brake control which realizes the time-charted operation will be described. FIG. 3 is a flow chart of a timer interrupt program used in the motor-driven brake control of the invention. FIG. 4 is a flow chart of a brake control subroutine. FIG. 5 is a diagram showing a transient diagram of a braking status. FIG. 6 is a flow chart of a motor-command computing subroutine. Description will be given about a case where the braking force control is applied to one wheel, for ease of explanation. In an actual vehicle, however, a brake control subroutine is repeatedly executed by the number of times corresponding to the number of electric braking devices installed.

The motor-driven brake control for generating a braking force is executed by use of a timer interrupt program shown in FIG. 3, which operates at fixed time intervals. The motor-driven brake is controlled by use of a brake control subroutine shown in FIG. 4. A brake status is changed in its phase according to a transient diagram of the brake statue shown in FIG. 5. In the transient diagram, when the brake switch is turned on, a braking phase is set up. When the brake switch is turned off, a return preparatory phase for returning the friction materials to their original positions is set up. When the return preparatory phase continues for a first predetermined time, the braking status shifts its changing phase to a return phase. In the return phase, the friction materials return to their original positions for a second predetermined time, and its changing phase shifts to a non-braking phase.

The brake control will be described hereunder. To start with, the timer interrupt program shown in FIG. 3, which is operated at predetermined time intervals, is executed. Upon start of the first execution of the timer interrupt program, step 1 is executed in which a pedal pushing force derived from the pushing force sensor 2 and a braking force derived from the thrust sensor 15, which are necessary for the motor-driven brake control, are input to the ECU. Then, step 2 is executed in which a brake control subroutine for a braking status (transient braking state) is executed. Step 3 is executed in which a motor command determined in the brake control subroutine is output to the related part to generate a predetermined braking force. The motor command is retained till a motor command is issued in the next execution of the timer interrupt program.

In the brake control subroutine shown in FIG. 4, a value as the product of multiplying the input pushing force by a coefficient is first used as a target value. In this instance, a proportional function is used. If necessary, a function constructed allowing for an allocation of front and rear braking forces may be used instead. In this subroutine, the brake status shown in FIG. 5 is divided into four braking-state changing phases (non-braking phase, brake phase, return preparatory phase, return phase), and a data processing is carried out in every phase.

Specifically, when after the electronic control unit is reset, the brake pedal is not depressed and the brake switch is in an off state, the braking status is in the non-braking phase. When in this non-braking phase the brake control subroutine starts to operate, step 11 is executed in which the motor current is 0 and a rotational direction of the motor is set to a return side, irrespective of the target value. Step 12 is then executed in which the control decides whether the brake switch is turned on or off, and if it is turned off, the control leaves the subroutine without taking any action. When the brake switch is in an on state, step 13 is executed in which the braking changing state of the braking status is changed (shifted) from the non-braking state to the control phase. In step 14, the control variable is cleared, and in step 15, the control enters a motor-command computing subroutine, and performs a motor command operation. In step 14, the control variable is cleared, and in step 15, the control enters a motor-command computing subroutine, and performs a motor command operation.

When the motor-command computing subroutine starts, step 51 is executed in which a difference "e" between a target value computed using a bake pushing force and an actual braking force F (derived from the thrust sensor) is computed, and a motor current and a rotational direction of the motor are computed by use of a function containing the difference as a variable (e.g., PI control). That is, the control sets a motor current (fi) and the motor rotational direction (fr) so that the braking force (F) is equal to the target value (the difference "e" is equal to zero), and leaves the subroutine.

When a second execution of the timer interrupt program starts, the control advances to a flow chart of the braking phase in the brake control subroutine since the braking status was shifted to the braking phase in the previous execution of the brake control subroutine.

In step 21, the threshold value is compared with the target value. When the target value is larger than the former, the control directly advances to step 23. When the target value is smaller than the latter, step 22 is executed in which the threshold value is used as the target value. In this case, the braking force is controlled using a value which is above a pushing force command.

In step 23, the control checks a braking-state changing phase of the braking status. When the brake switch is in an on state, viz., the brake pedal is left depressed, the braking phase is left as it is (the braking state is not changed). The control advances to the motor-command computing subroutine of step 27. In this step, such a motor current and a rotational direction of the motor as to make it approach to the target value are set up.

When the brake switch is in an off state, viz., the foot is moved apart from the brake pedal, in step 23, the control advances to step 24. In this step, the braking-state changing phase is changed (shifted) to "return preparatory phase". In step 25, a count of the control timer is cleared. In step 26, the threshold value is set to the target value. In step 27, the control determines a motor current and a rotational direction of the motor in the motor-command computing subroutine, and then leaves this subroutine.

Upon start of a third execution of the timer interrupt program, the control advances to a flow chart of the return preparatory phase in the brake control subroutine since in the braking status, the phase was shifted to the return preparatory phase in the brake control subroutine in its previous execution. In step 31, the threshold value is set to the target value.

In step 32, the control determines a motor current and a rotational direction of the motor in the motor-command computing subroutine. In step 33, the control timer is counted, and in step 24, this counting is continued for a first predetermined time, which is set at several hundreds milliseconds in advance (see FIG. 2). After the first predetermined time elapses, the control changes (shifts) the braking-state changing phase to "return phase" in step 35, clears again the control timer in step 36, sets a motor current I and a rotational direction, which are already set so, to those of the return side in step 37, and leaves this subroutine. At this time, the drag of the brake actually occurs; however, the driver does not have any uncomfortable feeling because of the presence of the minute braking force and the control time of several hundreds milliseconds. The control time of several hundreds milliseconds is used in consideration with a case where the piston is excessively moved backward at the time of abrupt pressure reduction for the braking force, and a time taken for resuming the braking force.

Upon start of a fourth execution of the timer interrupt program, the control advances to a flow chart of the return phase in the brake control subroutine since in the braking status, the phase was shifted to the return phase in the brake control subroutine in its previous execution.

In step 41, the motor current I and the rotational direction are left set to the return side, and in step 42, the counting of the control timer starts. In step 43, the control decides whether or not the second predetermined time, previously set at several tens milliseconds, elapses (see FIG. 2). When the second predetermined time elapses in step 43, the control changes the phase of the braking status to the non-braking phase in step 44, and reduces the motor current to zero (0), and leaves the subroutine. When the second predetermined time does not elapse yet in step 43, the control advances to the flow chart of the return phase, and continuously operates the electric motor to the return side till the second predetermined time terminates.

Thereafter, every braking operation, the brake control program is executed according to the transition diagram of the braking status, thereby effecting the brake control.

As described above, to adjust the pad clearance, a target value computed using a pushing force is compared with a threshold value as previously set. When the brake switch is in an on state and the target value is smaller than the threshold value, the electric motor is controlled in a state that the threshold value is used as the target value. The motor control is further continued for a first predetermined time after the brake switch is turned off. After the first predetermined time elapses, a brake return command is applied to the related part for a second predetermined time. Accordingly, the pad clearance is controlled without using the position sensor.

It should be understood that the control flow charts are exemplarily presented. If required, a flow chart to realize the time chart in FIG. 2 may be designed without using the timer interrupt program, while referring to the target value and the threshold value, and on/off state of the brake switch, As seen from the foregoing description, in the present invention, such a threshold value as to produce a minute braking force being controllable by the ECU is used. When a target value as computed using a pushing force is smaller than the threshold value, the brake control is performed using a predetermined value for the target value. When the brake is released, the braking force is controlled to be equal to the threshold value for a predetermined time having such a time length as not to create dragging feeling. In turn, the presence of a return command is continued for a predetermined time. In this way, the pad clearance may be adjusted without using the position sensor. Accordingly, there is no need of using the position sensor, which is essential to the conventional technique, and further of providing a space for accommodating the sensors in the caliper. The resultant electric braking device is small in size and low in weight. The number of required wires for sensors is reduced, and the device structure is simplified.

What is claimed is:

1. A control method for an electric braking device including a brake switch, a pushing force sensor, a thrust sensor, and an electric motor for moving a pad thrust member in a direction in which said pad thrust member approaches to a rotor rotating with a vehicle wheel associated therewith, thereby performing a braking operation, said method comprising the steps of:

comparing a brake target value computed by using an output signal of said pushing force sensor with a threshold value set to a minute braking force when said brake switch is in an on state, controlling said electric motor to apply a predetermined braking force when said brake target value is below said threshold value, and rotating said electric motor for a predetermined time to retract said pad thrust member after said brake switch is turned off.

2. The method of controlling an electric braking device according to claim 1, wherein said step of rotating said electric motor for said predetermined time is performed after said brake switch is turned off and a post control is continued for a first predetermined time.

3. The method of controlling an electric braking device according to claim 2, wherein said post control comprises said step of controlling said electric motor with said predetermined value as said brake target value when said brake target value is below said threshold value.

4. The method of controlling an electric braking device according to claim 1, further comprising the step of:

controlling said electric motor in accordance with a brake target value computed by using an output signal of said pushing force sensor and a braking force obtained from said thrust sensor.

5. The method of controlling an electric braking device according to claim 4, wherein said pad thrust member is coupled to said electric motor through a rotation-linear motion converting mechanism including a gear nut and a screw shaft screw-coupled to said gear nut, and wherein said thrust sensor is provided between a bearing rotatably holding said gear nut and a caliper.

6. An electric braking device comprising:

a caliper;

an electric motor;

a rotor rotating with a vehicle wheel associated therewith;

a pad thrust member movable in a direction in which said pad thrust member approaches to said rotor, thereby performing a braking operation;

a rotation-linear motion converting mechanism including a gear nut and a screw shaft screw-coupled to said gear nut;

a bearing for rotatably holding said gear nut; and a thrust sensor provided between and in direct contact with said bearing and said caliper for measuring a thrust force of said pad thrust member against said rotor, wherein said pad thrust member is coupled to said electric motor through said rotation-linear motion converting mechanism.

* * * * *